United States Patent
Joergens et al.

(10) Patent No.: US 8,289,565 B2
(45) Date of Patent: *Oct. 16, 2012

(54) METHOD, COMPUTER PROGRAM AND PRINTING SYSTEM FOR TRAPPING OF PRINT DATA

(75) Inventors: Dieter Joergens, Baldham (DE); Ulrich Baeumler, Poing (DE); José Larosa Ducato, Erding (DE); Goran Eiler, Poing (DE)

(73) Assignee: Océ Printing Systems GmbH, Poing (DE)

(*) Notice: Subject to any disclaimer, the term of this patent is extended or adjusted under 35 U.S.C. 154(b) by 102 days.

This patent is subject to a terminal disclaimer.

(21) Appl. No.: 12/832,459

(22) Filed: Jul. 8, 2010

(65) Prior Publication Data

US 2010/0296124 A1   Nov. 25, 2010

Related U.S. Application Data

(63) Continuation of application No. 11/944,097, filed on Nov. 21, 2007, now Pat. No. 7,817,305.

(30) Foreign Application Priority Data

Nov. 24, 2006   (DE) .......................... 10 2006 055 624

(51) Int. Cl.
*G06K 15/00* (2006.01)
*H04N 1/40* (2006.01)

(52) U.S. Cl. ....................................... 358/1.18; 358/3.2

(58) Field of Classification Search ....................... None
See application file for complete search history.

(56) References Cited

U.S. PATENT DOCUMENTS

| | | | | |
|---|---|---|---|---|
| 5,666,543 | A * | 9/1997 | Gartland ....................... | 715/205 |
| 5,982,997 | A * | 11/1999 | Stone et al. .................. | 358/1.15 |
| 6,597,469 | B1 * | 7/2003 | Kuroyanagi .................. | 358/1.15 |
| 7,265,854 | B1 * | 9/2007 | Hohensee et al. ............ | 358/1.15 |
| 2001/0055130 | A1 * | 12/2001 | Geurts et al. .................. | 358/530 |
| 2006/0033959 | A1 * | 2/2006 | Allen ........................... | 358/3.26 |

* cited by examiner

*Primary Examiner* — Gabriel Garcia
(74) *Attorney, Agent, or Firm* — Schiff Hardin LLP

(57) ABSTRACT

In a method for trapping of print data with a plurality of objects, transferring the print data together with first trapping instructions and/or parameters in a print data stream for execution of the trapping in a computer or a printing device. With the print data stream referencing resource data that can be repeatedly retrieved and which contain second trapping instructions and/or parameters specific to the printing device.

11 Claims, 14 Drawing Sheets table 1

| X direction | Range: 0.02 – 5.0 mm<br>0.057 – 14.2 point | Default:<br>0.1 mm |
|---|---|---|
| Y direction | Same range as X direction | Default:<br>X value | table 2

| X direction | Range: 0.02 – 5.0 mm<br>0.057 – 14.2 point | Default:<br>0.2 mm |
|---|---|---|
| Y direction | Same range | X value | table 3

| Trap step limit | Range: 0% - 100%<br>With increasing the value the number of traps will decrease. A minimum step of 5% is recommended. | Default:<br>25% |
|---|---|---|
| CMYK | The colorants CMYK on the base of the relative percentage will be compared.<br>The step limit can be different for each colorants. | |
| Spot color | The ND of the spot color will be compared with the ND of the medium color. (White paper is normally assumed.)<br>The spot color is build up in a different plane as the CMYK planes and therefore the percentages of the coverage cannot be compared. | |
| Indexed color | The spot colorants of the Indexed Color Space will be compared on the base of the relative percentage.<br>The step limit can be different for each colorants. | |

FIG. 6/ Page 1 table 4

| Black (density) limit | Range: 0% - 100% of the neutral density of Black | Default: 100% |
|---|---|---|
| | 0% - all colors are treated as black.<br>100% - only black is treated as black. | |
| | Spot colors can be treated as black by setting the Black Density Limit less than or equal to the neutral density of the spot color. | Spot | table 5

| Black color limit | Range: 0.0 – 1.0<br>0.0 (no colorant) to 1.0 (full concentration) | Default: 1.0 |
|---|---|---| table 6

| Black Overprint | | Default: |
|---|---|---|
| Text | Range: 0 – 999 point | 12 point |
| Lines | Range: 0.02 – 5.0 mm<br>0.057 – 14.2 point | Black Trap Width | table 7

| Center trap limit | Range: 0.0 – 1.0<br>0.0 (no center trap) to 1.0 (all center trap) | Default: 1.0 |
|---|---|---|

FIG. 6/Page 2

Table 8

| Normal | The expansion of the region is in the X- and Y-direction. The expansion at the edge occurs corresponding to the trap width. | Expansion | |
| --- | --- | --- | --- |
| | For example Color 1 (lighter) = yellow, for example Color 2 (darker) = blue, for example | Choke | Clipped Choke |
| Bevel | | | |
| Round | | | |
| Miter Default | | | Miter expansion trap |

FIG. 6/Page 3

| Offset | Name | Range | Meaning | O/M | Exception |
|---|---|---|---|---|---|
| 0 | Length | X'03 – FF' | Length of the triplet, incl. this field | M | |
| 1 | TID | X'??' | | M | |
| 2 | Trapping enable | | | M | |
| | | X'01' | • Trapping enabled | | |
| | | X'81' | • Trapping disabled | | |
| 3 | Unit Base | | | | |
| | | X'00' | • 10" | | |
| | | X'01' | • 10 cm | | |
| 4 – 5 | UPUB | X'0001 – 7FFF' | • L-Units per UnitBase, Note: X'02D0' = 1 point. | | |
| | | FFFF | • Use the L-Unit definition which is used for the IPDS command of which the triplet is a part. | | |
| 6 – end | Optional trapping parameter tags, see below: | | | | |

2. Trap Width for non black colors (optional)

| Offset | Name | Range | Meaning | O/M | Exception |
|---|---|---|---|---|---|
| 0 | Length | X'06' | Length of the tag, incl. this field | M | |
| 1 | TID | X'03' | | M | |
| 2 – 3 | X-dir | | Trap width – X direction | M | |
| 4 – 5 | Y-dir | | Trap width – Y direction | M | |

Byte 2 – 3: Trap width in the X-direction: The width is given in L-Units. The value must represent a value in the range from 0.057 to 14.2 points (1/72").

Byte 4 – 5: Trap width in the Y-direction: The same range as for the X-direction.

With a value X'FFFF' the value from the next lower level is used as default.

3. Trap Width for black colors / opaque colorants (optional)

| Offset | Name | Range | Meaning | O/M | Exception |
|---|---|---|---|---|---|
| 0 | Length | X'06' | Length of the tag, incl. this field | M | |
| 1 | TID | X'04' | | M | |
| 2 – 3 | X-dir | | Trap width – X direction | M | |
| 4 – 5 | Y-dir | | Trap width – Y direction | M | |

Byte 2 – 3: Trap width in the X-direction: The width is given in L-Units. The value must represent a value in the range from 0.057 to 14.2 points (1/72").

Byte 4 – 5: Trap width in the Y-direction: The same range as for the X-direction.

With a value X'FFFF' the value from the next lower level is used as default.

FIG. 13/Page 1

4. Trap Step limit (optional)

| Offset | Name | Range | Meaning | O/M | Exception |
|---|---|---|---|---|---|
| 0 | Length | X'03' | Length of the tag, incl. this field | M | |
| 1 | TID | X'05' | | M | |
| 3 | TS limit | X'00 – 64' | Trap Step limit in % | M | |

Byte 3: Trap step limit: The value is given in percent.

With a value X'FF' the value from the next lower level is used as default.

5. Black Density limit (optional)

| Offset | Name | Range | Meaning | O/M | Exception |
|---|---|---|---|---|---|
| 0 | Length | X'03' | Length of the tag, incl. this field | M | |
| 1 | TID | X'06' | | M | |
| 3 | BD limit | X'00 – 64' | Black Density limit in % | M | |

Byte 3: Black density limit: The value is given in percent.

With a value X'FF' the value from the next lower level is used as default.

6. Black Color limit (optional)

| Offset | Name | Range | Meaning | O/M | Exception |
|---|---|---|---|---|---|
| 0 | Length | X'03' | Length of the tag, incl. this field | M | |
| 1 | TID | X'07' | | M | |
| 3 | BC limit | X'00 – 64' | Black Color limit in % | M | |

Byte 3: Black color limit: The value is given in percent.

With a value X'FF' the value from the next lower level is used as default.

7. Black Overprint (optional)

| Offset | Name | Range | Meaning | O/M | Exception |
|---|---|---|---|---|---|
| 0 | Length | X'03' | Length of the tag, incl. this field | M | |
| 1 | TID | X'08' | | M | |
| 3 - 4 | BO Text limit | X'0000 – AFFF' | Text smaller than<br>Note: normal value X'21C0' = 12 point, if the L-Unit per Unit Base is X'02D0'. | M | |
| 5 - 6 | BO Line limit | | Lines smaller than<br>Note: normal identical to Black Trap Width | M | |

Byte 3: Black Overprint: The value depends from the size of a character or line.

With a value X'FF' the value from the next lower level is used as default.

FIG. 13/Page 2

8. Center Trap limit (optional)

| Offset | Name | Range | Meaning | O/M | Exception |
|---|---|---|---|---|---|
| 0 | Length | X'03' | Length of the tag, incl. this field | M | |
| 1 | TID | X'09' | | M | |
| 3 | CT limit | X'00 – 64' | Center Trap limit in % | M | |

Byte 3: Center Trap limit: The value is given in percent.

With a value X'FF' the value from the next lower level is used as default.

9. Trap Edge Shape (optional)

| Offset | Name | Range | Meaning | O/M | Exception |
|---|---|---|---|---|---|
| 0 | Length | X'04 or 08' | Length of the tag, incl. this field | M | |
| 1 | TID | X'0A' | | M | |
| 3 | TrapEdge | | Trap Edge Shape | M | |
| | | X'01' | • Bevel | | |
| | | X'02' | • Round | | |
| | | X'03' | • Miter | | |
| | | X'04' | • Normal | | |
| | | X'05' | • Diamond | | |
| | | X'06' | • Elliptic | | |
| 4 | Reserved | X'00' | Reserved, should be zero | M | |
| 5 – 7 | Miter limit | | Miter limit | O | |

Byte 3: Trap Edge shape

Byte 5 – 7: Miter Limit. The parameter is only present when the trap edge type is Miter X'03'.

With a value X'FF' the value from the next lower level is used as default.

10. Trap Form (optional)

| Offset | Name | Range | Meaning | O/M | Exception |
|---|---|---|---|---|---|
| 0 | Length | X'03' | Length of the tag, incl. this field | M | |
| 1 | TID | X'0B' | | M | |
| 3 | TrapForm | | Trap Form | M | |
| | | X'01' | • Spread | | |
| | | X'02' | • Choke | | |
| | | X'03' | • Center | | |
| | | X'04' | • Slide | | |
| | | X'FF' | • Default | | |

Byte 3: Trap Form. With a value X'FF' the value from the next lower level is used as default.

FIG. 13/Page 3

11. Sliding Trap limit (optional)

| Offset | Name | Range | Meaning | O/M | Exception |
|---|---|---|---|---|---|
| 0 | Length | X'03' | Length of the tag, incl. this field | M | |
| 1 | TID | X'0C' | | M | |
| 3 | SlideLim | X'00 – 64' | Sliding Trap limit, in % | M | |

Byte 3: Sliding Trap limit. With a value X'FF' the value from the next lower level is used as default

FIG. 13/Page 4

METHOD, COMPUTER PROGRAM AND PRINTING SYSTEM FOR TRAPPING OF PRINT DATA

RELATED APPLICATION

The present application is a continuation application of parent application Ser. No. 11/944,097 filed Nov. 21, 2007 titled: "Method, Computer Program And Printing System For Trapping Of Print Data, and issued Oct. 19, 2010 as U.S. Pat. No. 7,817,305".

The present application is also related to U.S. application Ser. No. 12/514,612 filed May 13, 2009 titled: "Method, Computer Program And Print System For Trapping Print Data".

BACKGROUND

The preferred embodiment concerns a method, a computer program and a printing system for trapping of print data.

The preferred embodiment is connected with other disclosures that are described in the German patent applications DE 10 2006 055 587.2, DE 10 2006 055 624.0, DE 10 2006 055 625.9 and DE 10 2006 055 626.7. Their content is herewith incorporated by reference into the present specification.

Color documents or document parts such as, for example, images, color graphics or the like are for the most part described by image data that are subdivided into color separations. This type of data division in turn corresponds to many print output methods or apparatuses that print the image data in color separations on a recording medium, for example in the colors yellow (Y), magenta (M), cyan (C) and black (K) or in black and one or more colors, what are known as highlight color colors or the Océ Custom Tone® highlight color colors.

The application develops and distributes corresponding digital electrographic printing systems. For example, they are described in the publication "The World of Printers, Technologies of Océ Printing Systems", Dr. Gerd Goldmann (Editor), Océ Printing Systems GmbH, Poing, 7th Ed. (2002). Various offset and digital printing technologies are described on pages 249-286, various digital color printing system are described on pages 287-325 and foundations of color printing are described on pages 233-248. Bases of digital image processing are described on pages 209-232. Principles of highlight color printing are described on pages 246-248.

A digital printing system for two-sided monochrome and/or color printing of a recording medium is known from WO 98/39691 A1. A method for preparation of a pixel file in which contiguous areas of the image that are made up of the pixels are determined is known from the international patent application Nr. PCT/EP2004/00700 (publication number WO 2005/001765).

Methods for trapping of image data are known from U.S. Pat. No. 5,581,667, EP-A2-484 890, US 2003/0090689 A1 as well as US 2006/0033959 A1, U.S. Pat. No. 4,931,861, EP-A2-929 189, DE-A1-199 12 511, US 2001/0055130 A1 and EP-A2-833 216.

There is what is known as the passer problem in both digital printing and offset printing. It is thereby that, given a plurality of printing procedures on one sheet of paper, due to mechanical tolerances it cannot be guaranteed that the positioning of the paper is always exactly the same in all printing procedures. The problem occurs in single-color printing when front side and back side are printed separately or given multi-color printing on one side.

Given front and back side printing this problem occurs when, for example, a border is printed on each of the front and back sides and these borders do not exactly lie atop one another, which is noticed when the page is held up to the light.

Given multi-color printing the colors are offset relative to one another. As long as the different colors do not touch, this does not stand out further. If the colors touch, due to the offset, the colors are printed atop one another at the contact line, which leads to an adulteration of the color impression or a white gap (flash) at the contact line.

While the adulteration of the color impression is for the most part still tolerable, the flashes are extremely noticeable, as is shown by the comparison of exactly positioned colors in FIG. 1A and offset positioned colors in FIG. 1B of prior art U.S. Pat. No. 7,856,140.

To remedy the flash problem it is known to enlarge or, respectively, to spatially over-fill the lighter colors. Although a greater overlap of the colors is therewith obtained, the flashes disappear, as is shown by the comparison of offset positioned colors in FIG. 2A and overlapped colors in FIG. 2B of prior art U.S. Pat. No. 7,856,140. Given the enlargement of an object care must be taken in the later printing procedure that the overlapping part is printed translucent since otherwise the problem shifts to the edge of the enlarged object.

The method just described that remedies this problem has the name "trapping" (overfilling). Trapping is offered in different products on the market. For example, it is a component of raster image processors (RIPs) of the page description language (PDL) Adobe PostScript Level 3, the software SuperTrap® offered by the company Heidelberger Druckmaschinen AG or the software TrapWise® that is offered by the company Creo.

Trapping can be implemented in two different ways. Trapping can be dealt with at the object level or at the bitmap level.

In electrophotographic high-capacity printing systems the problem of trapping was previously solved at the bitmap level (see, for example, WO 2006/069980 A1), since at the bitmap level the print data can be automatically processed without delay. Corresponding trapping methods can therefore be integrated into an electrophotographic high-capacity printing system without the printing operation hereby being impaired.

However, given the treatment of trapping at the bitmap level the information regarding the objects is missing, whereby the trapping at the bitmap level is in principle significantly less efficient than the trapping at the object level.

The products indicated above that are available on the market (which are components of raster image processors (RIPs) of the page description language (PDL) Adobe PostScript Level 3, the software SuperTrap® offered by the company Heidelberger Druckmaschinen AG or the software TrapWise® that is offered by the company Creo) generate additional trapping objects at the borders of the objects, which trapping objects reduce the effect of the passer problems. These additional trapping objects significantly increase the data volumes of the corresponding print data file. In extreme cases the data volume can even increase tenfold since the number of the individual objects can be multiplied. Given these known solutions the trapping is executed interactively so that an experienced user efficiently controls the generation of the additional trap objects dependent on the document to be trapped. These methods have proven their worth in offset printing, in which a great deal of time is normally available in order to correspondingly process the print document and interactively implement a trapping before the printing procedure.

A method in which a trapping is executed in an electrophotographic printer is known from US 2003/017934 A1. In this method edge lists are produced from the objects and objects that do not correspond to a predetermined shape are divided up into corresponding standard shapes. Information of the objects is thus stored with the edge lists before they are rastered. The trapping itself occurs at the bitmap level, whereby the additional information of the objects (for example in the form of the edge lists) is taken into account as well. The disadvantage of the trapping on the bitmap level, that information regarding the objects is no longer present, is thus somewhat reduced with this method. However, the generation of these edge lists is on the one hand complicated and additionally a plurality of objects are generated from individual objects, which again makes the processing more difficult. Furthermore, the objects so generated are no longer identical with the original objects. Objects with complex shapes cannot be processed or can only be processed in a very limited manner with this method.

A method for trapping of print data present in a print page language (PDL—Page Description Language) arises from U.S. Pat. No. 5,666,543. The print data are hereby initially analyzed and trapping instructions are generated before said print data are supplied to a raster image processor (RIP). The trapping instructions indicate whether the print data comprise text or graphics and whether they should be trapped in the RIP using a shape directory. The shape directory is generated in the analysis of the print data and transmitted to the RIP. The shape directory is a list of the shapes of the objects. The trapping regions or overfills are generated upon rastering in the RIP. This known method corresponds to the method known from US 2003/017934 A1, whereby the shape directory corresponds to the edge list.

The prior art can thus be summarized to the effect that there are trapping methods on the one hand that trap at the object level. However, these methods are not suited to implement the trapping in real time during the printing procedure in a digital electronic printing machine. These methods are primarily provided for offset printing in which the image data are processed with an external raster image processor. On the other hand, it is known to implement trapping in real time in digital electronic printers. However, here the trapping occurs at the bitmap level, whereby limited information regarding the objects is made available to the trapping on the bitmap level by means of edge lists or shape directories.

It was previously assumed that trapping at the object level in a digital printing machine cannot be implemented in real time since a user cannot interactively affect the trapping with regard to the plurality of different rules and the trapping at the object level requires such large-volume files that cannot be processed in real time.

Electrophotographic high-capacity printing systems are often components of digital production printing environments in which the pre- and post-processing of printed media is executed in an automatically controlled manner. In such production environments the document data are transmitted between the individual workstations in the form of document data streams.

Various print data streams and printing systems that are suitable for processing of the most varied print data streams (including AFP and IPDS) are described in the already aforementioned publication "The World of Printers, Technologies of Océ Printing Systems", Dr. Gerd Goldmann (Editor), Océ Printing Systems GmbH, Point, 7th Ed. (2002), ISBN 3-00-001019-X. In chapter 13 (pages 343 through 361) the print server system Océ PRISMAproduction is described in this regard, for example. This flexible print data server system is, for example, suitable to convert print data from data sources (such as a source computer) into a specific output format (the print data to be received in a specific printer data language such as AFP (Advanced Function Presentation), MO:DCA, PCL (Printer Command Language), PostScript, SPDS (Siemens Print Data Stream), in the Portable Document Format (PDF) developed by the company Adobe Systems Inc. or in the language Line Coded Document Data Stream (LCDS) developed by the company Xerox Corporation) into a specific output format (for example into the Intelligent Printer Data Stream (IPDS) format) and to transfer the data to a print production system in this uniform output format. Various technologies for color printing are described in chapter 10.

In the specification and further development of print data streams the problem sometimes exists that new commands must be inserted into the data stream in order to allow for the further technical developments of computers, printing apparatuses and/or post-processing apparatuses. The establishment of such extensions is for the most part a relatively complicated method in which various industry partners must cooperate in order to match the changes or innovations among one another.

In U.S. Pat. No. 6,097,498 it is described how three new data stream commands (namely WOCC, WOC and END) are to be added to the Intelligent Printer Data Stream (IPDS™).

A further possibility to store additional control data in an AFP data stream is to store data in what are known as object containers (see, for example, the pages 93-95) in the publication Nr. SC31-6802-05.

Further techniques for insertion of new control information into AFP or IPDS data streams are described in WO 03/069548 (originating from the applicant).

How data objects such as text, images, graphics, barcodes and fonts are handled in the data streams AFP and IPDS is described in the IBM publication SC31-6805-05 with the title "Image Object Architecture Reference". For this what is known as an Object Content Architecture (OCA) is defined in which data structures designated for the respective objects and control parameters or parameters identifying the objects are established; for example, what is known as the Image Object Content Architecture (IOCA) for images, a corresponding COCA for graphics, a PTOCA for presentation texts etc. The IOCA is described in detail in the aforementioned document. Further IBM documents that are helpful for the understanding of the data streams are cited on pages v through vii of the document.

Details of the document data stream AFP™ are described in the publication Nr. F-544-3884-01, published by the company International Business Machines Corp. (IBM) with the title "AFP Programming Guide and Line Data Reference". The document data stream AFP was further developed into the document data stream MO:DCA™ which, for example, is described in the IBM publication SC31-6802-06 (January 2004) with the title "Mixed Object Document Content Architecture Reference". Details of this data stream are also described in U.S. Pat. No. 5,768,488. Specific field definitions of the data stream that contain control data (what are known as "structures fields") are also explained there.

AFP/MO:DCA data streams are frequently converted into data streams of the Intelligent Printer Data Stream™ (IPDS™) in the course of print production jobs. Such a process is shown in U.S. Pat. No. 5,982,997. Details regarding IPDS data streams are, for example, described in the IBM document Nr. S544-3417-06, "Intelligent Printer Data Stream Reference", 7th edition (November 2002).

IPDS and AFP data streams normally contain and/or reference what are known as resources that contain data that are required for output of the documents. Via simple referencing, the data of a resource can thereby be used multiple times for one or more print jobs (that in turn comprise a plurality of documents or, respectively, document parts) without having to be transferred multiple times. The quantity of the data to be transferred from one processing unit (for example a host computer generating the documents) to a subsequent processing unit (for example a print server or a printing apparatus) is thereby reduced, in particular when data from a plurality of documents that comprise or require the same data in part are to be transferred. Examples of such resources are character sets (fonts) or forms to be overlaid with documents (overlays). The resources can thereby be contained in the print data stream itself or be transferred separately from this between the participating systems and only be respectively referenced within various documents. It can in particular be provided that the resources are already stored in the further processing apparatus (for example print server or printing apparatus), such that they do not have to be re-transferred with each print job but rather only must be referenced.

Given the presentation of AFP document data, resources that are situated at various points in the AFP document data stream or originate from various sources are merged with the corresponding variable data. The resource data can thereby be integrated into the document data stream as internal resources or be retrieved from libraries as external resources via a resource name. Furthermore, the data are checked for consistency in a parsing process.

In the document "Print Services Facility for OS/390 & z/OS, Introduction", Version 3, Release 3.0, Nr. G544-5625-03 by the company IBM from March 2002, details are described of how what is known as a line data or MO:DCA document data stream is converted into an Intelligent Printer Data Stream data stream. The software program Print Service Facility (PSF) thereby combines variable document data with resource data into output data that are sent to a printer (as an output apparatus) to administer and control said printer. Software products under the trade name Océ SPS and Océ CIS that exhibit corresponding functions are developed and distributed by the applicant.

A method for secure administration and allocation of resources in the processing of resource-based print jobs is known from US 2005/0024668 A1. A method for processing of resource data in a document data stream is known from WO-A1-2004/0008379.

Methods for color reproduction in offset printing machines are known from Stollnitz, J. et al., "Reproducing Color Images Using Custom Inks", ACM Proceedings of the 25$^{th}$ annual conference on Computer graphics and interactive techniques, SIGGRAPH '98, ACM Press, July 1998.

The further aforementioned publications or documents and patent applications are herewith incorporated by reference into the present specification, and the methods, systems and measures described there can be applied in connection with the present preferred embodiment.

SUMMARY

It is an object to achieve a method, a computer program and a system for trapping of print data, whereby the trapping can largely be executed automatically. The trapping can in particular be executable in an electronic, digital high-capacity printing system.

In a method for trapping of print data with a plurality of objects, transferring the print data together with first trapping instructions and/or parameters in a print data stream for execution of the trapping in a computer or a printing device. With the print data stream referencing resource data that can be repeatedly retrieved and which contain second trapping instructions and/or parameters specific to the printing device.

BRIEF DESCRIPTION OF THE DRAWINGS

FIG. 6 shows tables of individual trapping parameters;

FIG. 13 shows AFP/IPDS trapping parameter triplets in table form.

DESCRIPTION OF THE PREFERRED EMBODIMENT

Figure 1A:
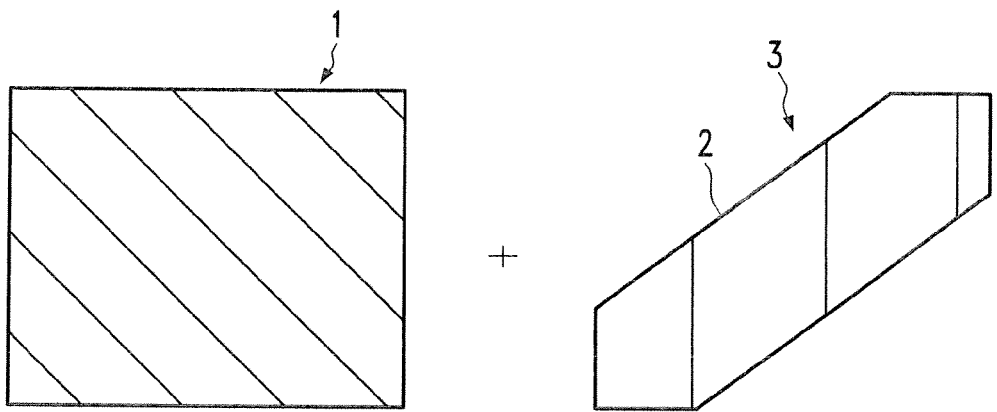
FIGS. 1a through 1c schematically illustrate the insertion of an object into a bitmap file.

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

In a first aspect of the preferred embodiment, for trapping of print data with a plurality of objects the objects are individually carried over into a pixel file and the following steps are respectively executed:

determination, according to predetermined trapping rules, of at least one overfill for the respective object relative to the color regions adjoining the object in the pixel file and insertion of the object and the at least one overfill into the pixel file, whereby upon insertion the object and the overfill are rastered in the pixel file.

Via the transfer of individual objects the advantage can be achieved that the entire information of the objects is available for the calculation of the overfills without the production of additional tables or lists about the shape of the objects. Since the overfills in the pixel file are then immediately generated either given knock-out or given rastering, it is not necessary to generate additional objects at the object level for the overfills. The determination of the overfills using the individual objects with regard to the pixel file and the insertion of the overfills into the pixel file can thus be executed in the print data controller of the printing apparatus without delay of the printing process.

The transfer of individual objects does not necessarily mean that only a single object can be carried over at a specific point in time. It is also possible that a plurality of objects are carried over in parallel from the print data into the pixel file. Rather, individually means that the objects that are carried over do not spatially overlap in the image with other objects that are simultaneously transferred (such that the calculation of the overfills would hereby be significantly complicated).

The overfills are generated both upon knock-out via reduction of the area for the objects to be inserted and upon rastering via expansion of the objects with overfills.

Since the objects are individually transferred into the pixel file, the trapping can be executed in a print server and/or printing apparatus without delay of the printing process. It is thus possible to trap a print data stream "on the fly".

The method is advantageously implemented in real time in a print data controller of a printing apparatus.

In a second aspect of the present preferred embodiment that can be applied alone or in connection with the first aspect, a method is provided for trapping of print data with a plurality of objects, in which method overfills are determined only at edges of one of the respective objects when the brightness of the respective object differs from the adjoining region by a difference amount that is greater than the predetermined threshold. Given adjoining objects with similar brightness, it is hereby possible to provide no overfills since these barely appear due to the similar brightnesses. The calculation of a significant number of overfills is thereby foregone, whereby it is simpler to implement the inventive method in real time. This method is advantageously developed such that overfills are always determined given an object with highlight color color even if the adjacent object should possess a similar brightness, since given an incorrect registration of an object comprising a highlight color color what are known as the "flashes" (which are narrow white gaps between adjoining objects that should be avoided) always arise.

In a third aspect of the present preferred embodiment that can be applied alone or in connection with the aforementioned aspects, overfills in the region of a narrow, long point that, for instance, form a corresponding point are not extended beyond a predetermined width of the overfill in the X-direction and in the Y-direction relative to the outermost point of the point of the non-trapped object. According to this aspect of the invention, the overfill can simply be truncated when a specific distance from the point is reached. This method can be implemented with the least computational effort. The execution of the inventive method in real time and without elaborate computer devices is hereby made easier.

According to a fourth aspect of the present preferred embodiment that can be applied alone or in connection with the aforementioned aspects, a method for trapping of print data with a plurality of objects is provided. The print data are thereby generated together with trapping instructions in a print data stream for execution of the trapping, transferred to a print data processing apparatus and/or processed in a print data processing apparatus, whereby the print data stream references resource data that comprise trapping parameters and/or trapping instructions.

The print data stream can in particular be transferred to a print data processing apparatus, for example to a printing apparatus. The trapping parameters and/or trapping instructions are advantageously comprised in a print data protocol.

A method for trapping of print data with a plurality of objects can also be provided in which print data together with trapping instructions are transferred in a print data stream for execution of the trapping in a printing apparatus. The trapping instructions can in particular be comprised in a print data protocol. The print data stream thereby references resource data that comprise trapping parameters and/or trapping instructions.

The use of the resource structure for the trapping is in particular particularly advantageous when an operator of a printing system adjusts in a print data processing apparatus such as, for example, a print server, a raster processor a print data controller (arranged for example, in a printing apparatus) via storage of corresponding trapping resources. The adjustment of this apparatus can thereby advantageously occur individually in a specific trapping method. Furthermore, for each print job it can thereby advantageously be that the trapping parameters and/or trapping instructions are not to be re-transmitted to the apparatus executing the trapping.

The fourth aspect of the preferred embodiment can thereby in particular also include the generation and administration of corresponding trapping. These can, for example, be generated and modified as a file or file collection (library) in a host computer, a client or a print server, be administered in these computers and be stored and exchanged between them. They can also be exchanged with a printing apparatus with a data stream or independent of a data stream, in particular be transferred to it or be received by it, be stored, generated, modified or administered in said printing apparatus.

According to a fifth aspect of the preferred embodiment that can be applied alone or in connection with the aforementioned aspects, it is provided that for trapping of print data the print data are generated, prepared and/or transferred in a print data stream together with trapping instructions. The print data stream is thereby structured in different levels and the trapping instructions comprise level-related priority rules. The print data stream can in particular be transferred to a print data processing apparatus. It can be transferred to a printing apparatus.

According to a sixth aspect of the preferred embodiment that can be applied alone or in connection with the aforementioned aspects and in particular in connection with the fifth aspect, for trapping of print data the print data in a print data stream are generated, transferred and/or processed in a print data processing apparatus together with the trapping instructions. The print data stream is structured in different levels. The higher the level, the greater its scope in which the instructions contained in the respective levels act. According to this aspect of the invention, trapping instructions from lower levels have priority relative to trapping instructions from higher levels. Corresponding to this, a priority instruction can in particular be provided according to the fifth aspect. The print data stream can in particular be transferred to a print data printer or copier apparatus. It can be transferred to a printing apparatus.

Printing instructions (in particular color instructions) are typically inherited from higher levels to lower levels. This means that a printing instruction in a higher level automatically affects all levels situated below it. The printing instructions in higher levels thus typically have priority over printing instructions in lower levels.

Contrarily, given trapping it is advantageous when the trapping instructions from lower or bottom levels have priority over trapping instructions of higher levels since the trapping instructions in a lower level are directly related to the respective object and thus are more specific to the respective object.

According to a seventh aspect of the preferred embodiment that can be applied alone or in connection with the aforementioned aspects, and in particular with the fifth aspect, the print data in a print data stream are transferred together with trapping instructions into a printing apparatus and the print data stream is structured in different levels. The higher the level, the greater the scope in which the instructions contained in the respective level act. According to this aspect, a trapping instruction is provided in the highest level, with which trapping instruction the trapping can be activated or deactivated in the entire range of the highest level. This in particular represents a type of global switch with which trapping can generally be activated or deactivated. In principle, the possibility is hereby granted to the operator of a printing system to activate or deactivate trapping in a print data stream when the respective trapping instruction is respectively used alone in the highest level. This method can in particular also be used in combination with the method explained above in which trapping instructions from lower levels have priority relative to trapping instructions from higher levels, whereby this "switch" in the highest level breaks this priority rule. A priority instruction according to the fifth aspect of the invention can in particular be provided corresponding to this.

In the trapping methods of the different aspects explained above the method is typically controlled by means of trapping parameters and trapping instructions. In this method of the different aspect it is appropriate to provide a set of specification values (trapping parameters and trapping instructions) in the printing apparatus or in its print data controller, according to which specification values the trapping method can be controlled. Since the trapping method is very much determined by the quality of the printing apparatus, it is appropriate to provide a complete set of such specification values, such that in practice print data are to be transmitted to the printing apparatus with quite a few further parameters and trapping instructions that individually match the trapping method to the respective print data.

All aforementioned aspects are in particular advantageously usable in connection with the aforementioned data streams Advanced Function Presentation (AFP) and the data streams derived therefrom (such as, for example, MO:DCA or IPDS), which are subsequently also called AFP/IPDS data streams.

The pixel file can be a bitmap file designed in the classical sense, in which only a one-bit item of information is provided regarding each pixel. However, it can also be a bitmap in which each pixel is encoded in a plurality of bits, for example 4 or 8 bits, in particular in a per-byte encoding. For example, various grey values (for example $2^4=16$ or $2^8=256$ grey values) can thereby be stored with regard to each pixel. Both types of pixel file are viewed as bitmaps in the scope of the present specification.

In the cited aspects of the preferred embodiment in particular a host computer or a print server can be provided for transfer of the document data streams between a data processing system generating the document data stream and a data processing system (as a generating data processing system) processing the document data stream. The processing data processing system can in particular be designed as a print server, as a computer with a parsing unit and/or as a raster processor and in particular as a print data controller integrated into a printing apparatus or connected to this. Given the output of the data by a host computer to a print data controller integrated into a printing apparatus via one of the cited systems (such as, for example, a print server), this system can in particular convert the data, for example from the MO:DCA format into the IPDS format.

Fundamental Principle of the Method

A fundamental principle of trapping is simple and already known from diverse trapping methods: the lighter colorant is slightly expanded in the region that should be occupied by the darker colorant. The lighter colorant is obscured by the darker colorant and should no longer be recognizable. The darker colorant or the darker color is determinative for the contour of the object.

The method of the preferred embodiment for trapping of print data with a plurality of different objects is subsequently explained using FIGS. 1a through 1c and 2a through 2c.

Essentially, the print data exist in a format in which individual objects are defined. These are normally a plurality of objects. The print data thus normally comprise objects in vector representation and other predetermined objects before the trapping. With the insertion of the trapping regions the print data are simultaneously rastered into a bitmap file. In the present method this occurs in that the print data comprising a plurality of objects and a bitmap file into which the print data are to be transferred are simultaneously provided. The objects are individually transferred into the bitmap file. FIG. 1a shows a rectangle 1 that is contained in a bitmap file and is filled with a color with a predetermined brightness. Furthermore, FIG. 1 shows a diagonally-running bar 2 that is an object 3 of the print data. This bar should be inserted into the rectangle 1 such that it extends from the lower left corner of the rectangle 1 to the upper right corner. The bar 2 is lighter than the rectangle 1. The bar 2 is a component of the print data and is depicted in this as a vector object. The bar 2 is thus an object. The rectangle is represented by pixels in the bitmap file. It is therefore not an object.

Figure 1B:
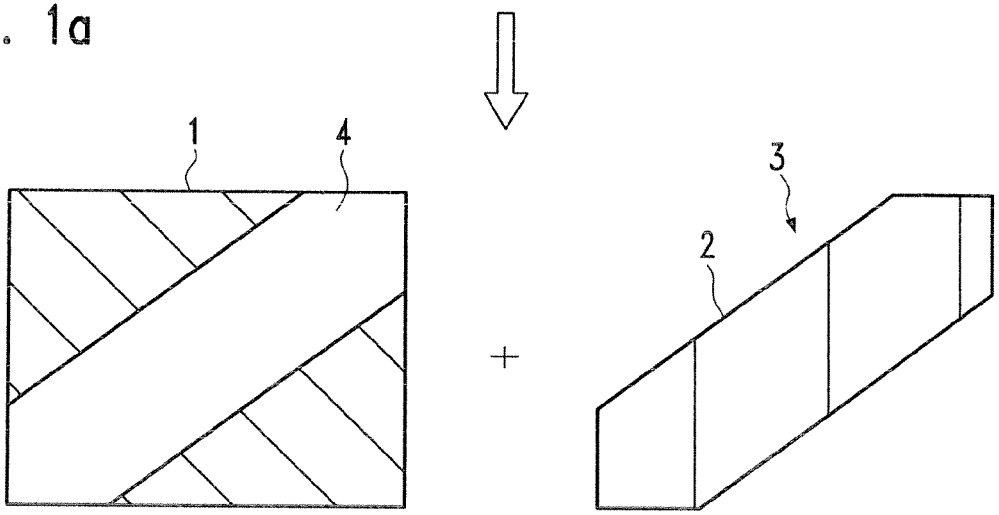
Figure 1C:
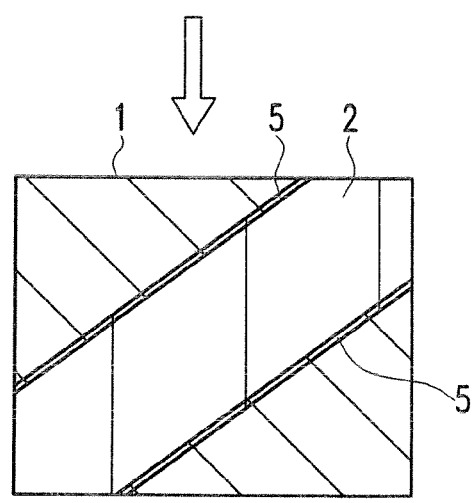

In the rectangle 1 contained in the bitmap file the region 4 in which the bar 2 should be inserted is initially punched out (knocked out) (FIG. 1b). It is hereby avoided that there is a large-area overlap of the colors of the rectangle 1 and of the bar 2, whereby the color of the bar 2 is enforced true to the original. Since the bar is lighter than the rectangle 1, the knocked-out region 4 corresponds exactly to the size of the bar 2.

The object 3 in the form of the bar 2 is subsequently inserted into the knocked-out region 4 in the bitmap file. The object 3 is hereby rastered into pixels that are entered at the corresponding points in the bitmap file. Since the object 3 is lighter than the adjoining rectangle 1, the bar 2 in the bitmap file is respectively expanded at the edges by a trapping region or, respectively, an overfill (which extends beyond the knocked-out region 4) to the dark section of the bitmap file. The contour of the bar 2 is demarcated by the darker color of the rectangle 1 that is cut out exactly in the shape of the bar.

Upon rastering of the object 3 the trapping regions or overfills 5 (calculated in advance using the object) have been added.

In the image with the bar 2 crossing the rectangle 1 (shown in FIG. 1), a circle 6 should now be inserted in the center of the rectangle 1. The circle 6 is filled with a color whose brightness lies between that of the rectangle 1 and the bar 2.

Figure 2A:
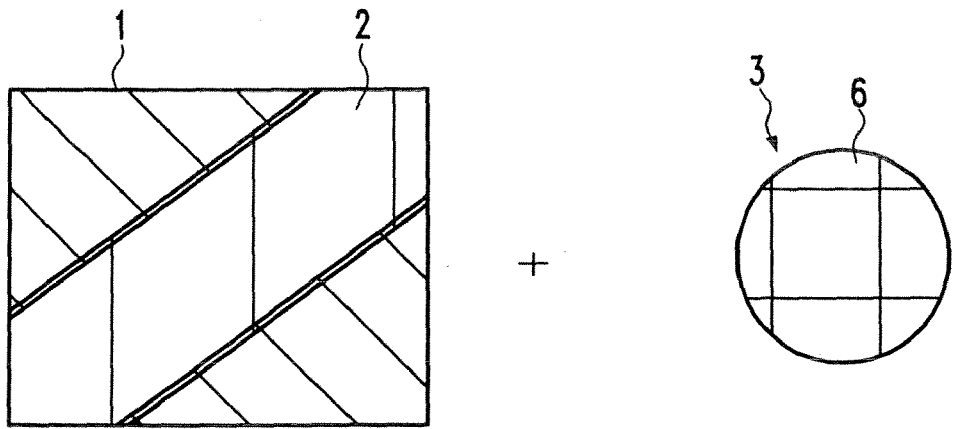
FIGS. 2a through 2c schematically illustrate the insertion of an object into a bitmap file.
Figure 2B:
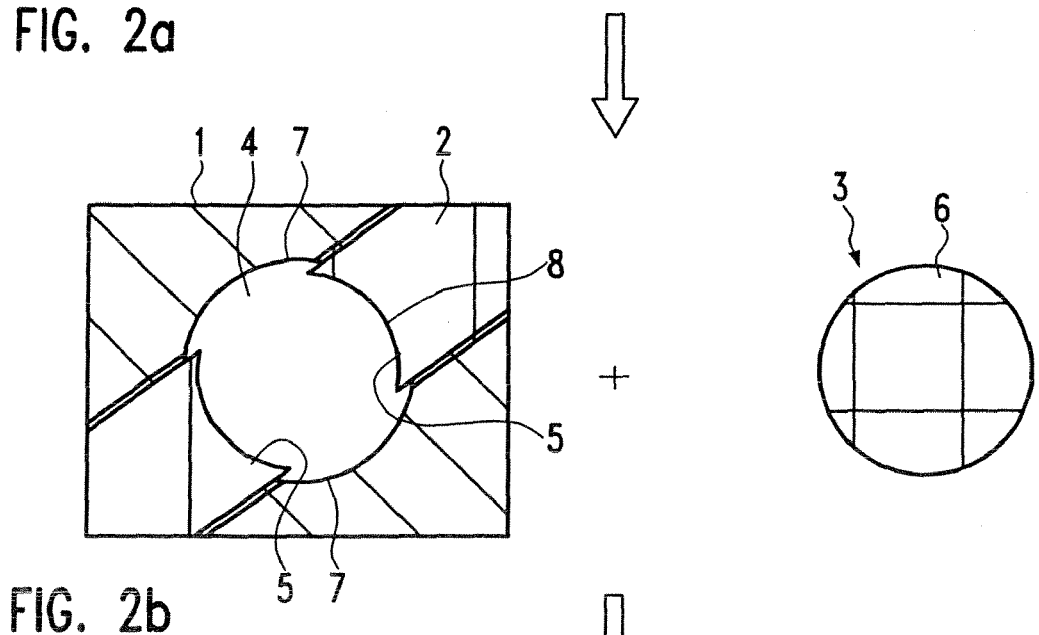
Figure 2C:
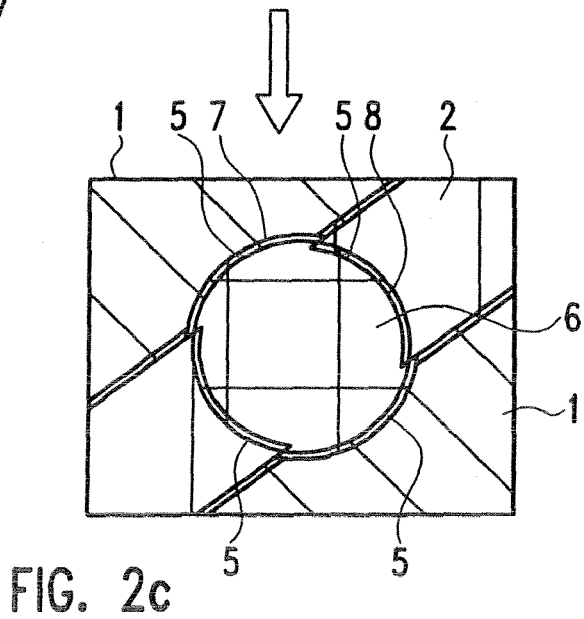

The diameter of the circle 6 is greater than the width of the bar 2, such that the circle extends on both sides beyond the bar 2 into the region of the rectangle 1. Upon knocking out the region 4 for the circle the edge 7 of the circle (which edge 7 abuts on the region of the rectangle 1) is knocked out with exactly the size of the circle, contrary to which the edge 8 of the circle that adjoins the lighter bar 2 is knocked out with a somewhat reduced size. The bar 2 hereby extends into the region of the circle 6. This region extending into the region of the circle 6 forms an overfill 5 (FIG. 2b).

The circle itself (which forms an object 3 in the print data) is subsequently inserted into the knocked-out region 4 in the bitmap file. The circle 6 is hereby rastered into pixels that are entered into the bitmap file at the corresponding points. Since the circle 6 is lighter than the region of the rectangle 1, the edge 7 of the circle 6 which adjoins the region of the rectangle 1 is expanded by an overfill 5 that extends into the region of the rectangle 1. Here the contour of the circle is defined by the edge of the dark color of the rectangle 1.

At the edge 8 of the circle 6 that adjoins the bar 2, the circle is inserted into the bitmap file with exactly its own size since here the darker (relative to the bar 2) color of the circle 6 defines the contour of the circle.

Using two objects (bar 2, circle 6) the insertion of the same into the bitmap file is explained above. The objects are hereby individually inserted into the bitmap file, whereby the trapping regions or overfills 5 are calculated at the objects themselves and the knocking-out and insertion of the objects occurs corresponding to the determined overfills. Upon insertion of the objects these are rastered in the bitmap file.

A preferred embodiment was explained above using objects that are filled with a color of predetermined brightness. The expression "color" was hereby used in a simplified manner. In multi-color printing a color is normally comprised of a plurality of colorants (dyes) that are superimposed in different ratios as needed. The individual colorants are dealt with in separate color separations by the control programs. All color separations are superimposed to generate an overall image. Given a multi-color printing the knocking out occurs throughout all color separations (planes), contrary to which the overfills are determined and inserted separately for the individual color separations.

Figure 3:
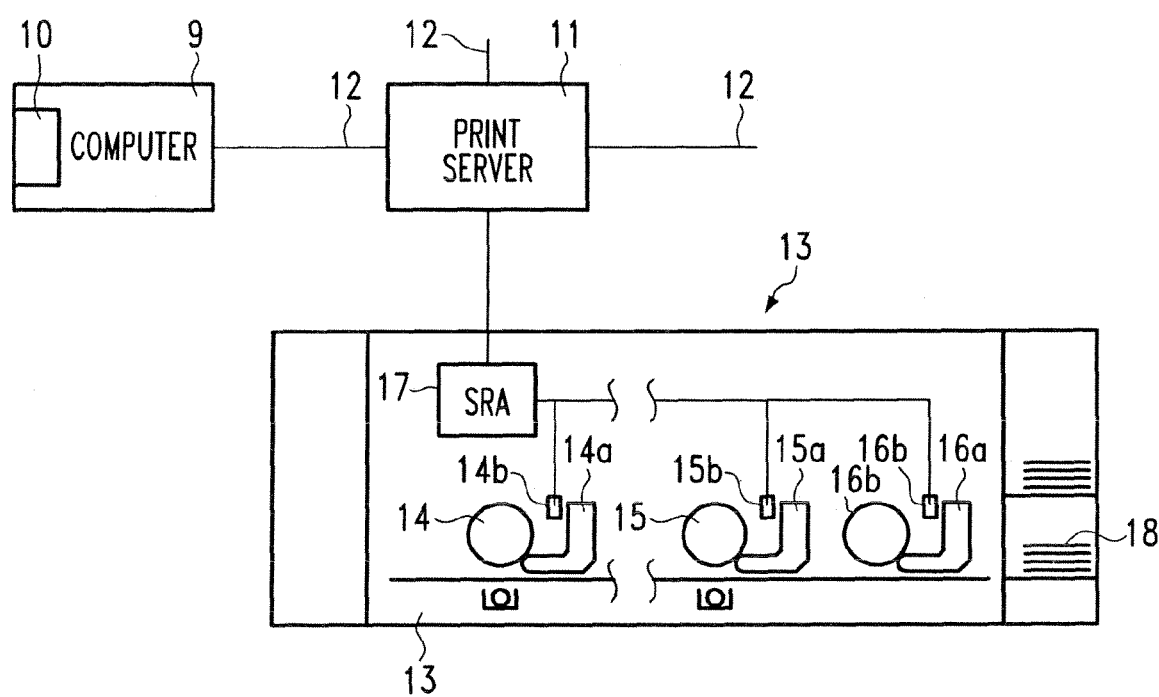
FIG. 3 schematically illustrates a printing system in a block diagram.

In FIG. 3 a printing system is shown with which color image data are generated in a user software program 10 running on a user computer 9. The image data so generated are supplied to a print server 11 as print data. These print data exist in a print data language such as, for example, AFP, PostScript, PDF or PCL. The print server 11 is connected to a network 12 (such as, for example, the Internet) and can receive print data from different user computers.

The print server 11 is connected with a printing apparatus 13. Only three printing stations 14, 15, 16 are shown in FIG. 3. A printing apparatus for printing with a highlight color color requires only two printing stations, three printing stations for printing with two highlight color colors and four to six printing stations for printing in a full color space (YMCK). Each printing station comprises a developer station 14a, 15a, 16a, an exposure unit 14b, 15b, 16b (such as, for example, a light-emitting diode comb) and further known electrophotographic components such as a photoconductor drum and a corotron device.

The data received from the print server 11 are received by a scalable raster architecture (SRA) print data controller 17 contained in the printing apparatus 13. In the print data controller 17 the trapping method is executed in real time and the print data are rastered into individual pixels and supplied in a color precise manner to the printing groups 14, 15, 16 or, respectively, the corresponding light-emitting diode combs 14b, 15b, 16b to form a latent image on the corresponding photoconductor drum. The electrostatic images so created are then electrophotographically developed with toner in a known manner and printed on a recording medium 18 (which here comprises individual paper sheets).

The raster process in the print data controller can additionally comprise a screening process in which the rastered pixels are prepared in a machine-specific manner before they are output to the light combs 14b, 15b, 16b. The screening process can be executed downstream from the trapping process or also in a step with the trapping process or the raster process. The execution in a common step is in particular possible given 1-bit print data (what are known as bi-level print data); the execution in separate steps is normally preferred given print data that are encoded in a plurality of bits (grey level data, what are known as multi-level print data).

Figure 4:
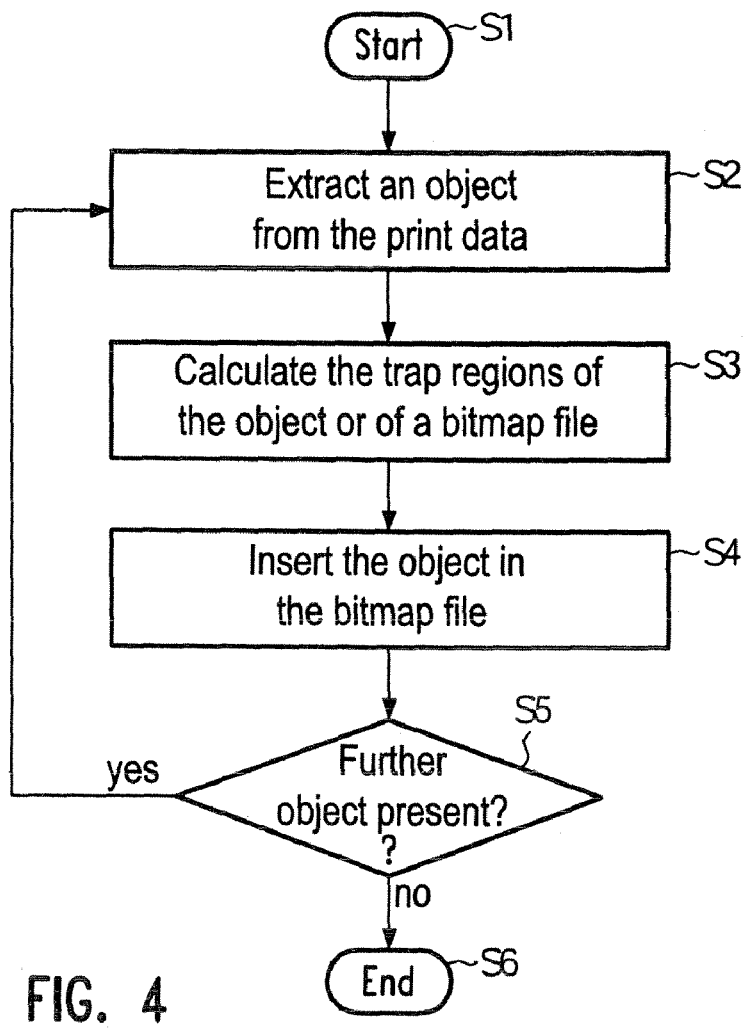
FIG. 4 shows the fundamental workflow of the method of the preferred embodiment in a flow chart.

The method workflow of the method for trapping and rastering of the print data that is executed in the print data controller 17 is subsequently explained in detail using the flow charts shown in FIGS. 4 and 5. The method initially starts with the step S1 (FIG. 4). In step S2 a single object is extracted from the print data, which single object should be inserted into a bitmap file at the corresponding point at which it is located in the print data.

In step S3 trap regions or overfills of the object are calculated relative to the color regions or grey level regions present and adjoining the object in the bitmap file. The rules according to which the overfills are calculated are explained in detail further below.

In step S4 the object is inserted into the bitmap file, whereby the object is rastered into pixels and the individual pixels are inserted into the bitmap file.

Subsequently it is checked whether a further object is present that is to be inserted into the bitmap file (step S5). In the event that a further object is present, the method workflow passes to the step S2. Otherwise the method ends with the step S6. The objects are thus individually transferred into the bitmap file with the present method. Using the object the overfills are hereby calculated in relation to the brightness of the color regions of the bitmap file adjoining the object. This has the advantage that the complete information of the objects is available without the production of additional tables or lists of the shapes of the objects. Since the overfills are generated upon knocking out or rastering in the bitmap file, it is not necessary to generate additional objects at the object level for the overfills. The determination of the overfills using the individual objects with regard to the bitmap file and the insertion of the overfills into the bitmap file can thus be executed in the print data controller 17 of the printing apparatus 13 without delay of the printing procedure.

Figure 5:
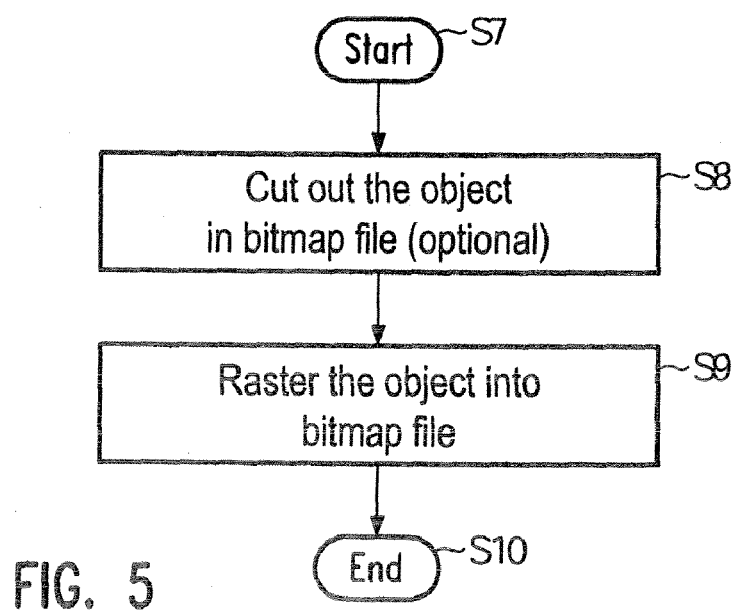
FIG. 5 illustrates the insertion of an object into the bitmap file in a flow chart.

The insertion of an object into the bitmap file (step S4) is depicted in the flow chart shown in FIG. 5. This method workflow begins with the step S7. In step S8 a region for insertion of the respective object is cut out or, respectively, knocked out in the bitmap file. Overfills that protrude into the region of the object are hereby to be taken into account. For example, such overfills occur when the object to be inserted is darker than the adjoining color region of the bitmap file. The excision can also be omitted in specific applications (for example overprint).

In the subsequent step the object is rastered into the bitmap file, whereby here overfills that extend the object into the adjoining regions of the bitmap file are to be taken into account. This is, for example, the case when the object is lighter than the adjoining regions of the bitmap file.

This method workflow is ended with step S10.

Trapping Rules

In the present method the neutral density of the respective colorant or of the respective color can be used to decide which colorant or which color is lighter. In the CMYK color space the neutral density ND for a colorant is defined by the following formula:

$$ND = -1.7 \cdot \log(1 - c \cdot (1 - 10^{-0.6d})),$$

whereby d is the specific neutral density of the respective colorant (which for the most part amounts to 0.61 for cyan, 0.76 for magenta, 0.16 for yellow and 1.70 for black. c is the concentration of the colorant or of the coloring agent with which this is applied on the recording medium. The concentration comprises a value range from 0 to 1. c is also designated as a degree of coverage.

The neutral density ND for a color results from the sum of the neutral densities of the individual colorants as follows:

$$ND = (ND_C + ND_M + ND_Y + ND_K)$$

In the present method three types of overfills or traps are to be differentiated: a SPREAD is an overfill in which the lighter color or the lighter colorant is expanded into the darker color or the darker colorant.

A CHOKE is an overfill in which the darker color region is located within a lighter color region, whereby the lighter color region is knocked out in the region of the darker color region so that the darker color region is reproduced in an optimally color-fast manner. The overfill of the CHOKE is hereby executed in that the knocked-out region of the lighter color region is reduced, whereby the lighter color region is again expanded into the darker color region.

There is also the case that two different colors or two different colorants that, in spite of their color differences, exhibit the same neutral density are present in two adjoining regions. The overfill hereby used is called CENTER or CENTER-TRAP, and it is symmetrically arranged around the boundary line between the two adjoining surfaces. The original contour is hereby maintained. However, such a CENTER overfill is not applied for black or non-transparent or opaque colors or opaque colorants. Given black and other opaque colors, the adjoining colors or colorants are always expanded below the black or the other opaque colors.

Different trapping rules are applied dependent on the respective type of the colorant or type of the color. Given translucent colors (that are subsequently also designated as "normal colors"), all trapping rules are applied. This also occurs for the typically employed process colors cyan, magenta and yellow that are translucent.

Transparent colors, in particular transparent lacquers, are in principle not trapped.

Non-transparent colors are handled like black, meaning that the same trapping rules as for black are applied, according to which the adjoining colorants and colors are expanded below the opaque color.

Special spot colors (such as, for example, gold or silver) that lie outside of the gamut of the employed color space are ignored in trapping. Spot colors are also designated as highlight color colors.

In an image data file there are many objects that adjoin one another. So that too many overfills are not generated that in their entirety can negatively influence the image, the difference of the neutral density of adjoining regions is calculated. An overfill is generated only when the difference amount lies above a predetermined magnitude. This threshold typically lies in the range from 0 to 50% and advantageously in the range from 5% to 40% of the degree of coverage with which the colorant is applied on the recording medium. In the framework of the preferred embodiment it is also possible to employ a threshold using the difference of the degree of coverage or the luminance of the adjacent color surfaces instead of the neutral density. Given multi-color printing this threshold is applied for every single colorant.

In principle it applies that, the greater the threshold, the fewer overfills are generated. Therefore in practice a threshold of at least 20% to 50% has proven to be very worthwhile.

Individual determined objects are treated with different trapping rules.

Graphic objects are objects defined by means of vectors that are for the most part filled with a monochrome color. Given two such adjoining objects it is simple to decide whether an overfill or no overfill is to be executed. It is more difficult when the graphic objects are developed in a color curve. This is explained in detail below.

In principle letter objects are treated like graphic objects. However, given small letter objects whose stroke width lies below a predetermined limit width, given trapping problems occur, whereby the trapping worsens the readability of the letters. The width of the letter objects is therefore compared with the maximum overfill width. In the event that the overfill width of the letter object is smaller than twice the maximum overfill width, the overfill width is reduced by a specific amount (for example by 50%). In the event that the width of the object is still smaller than twice the reduced maximum overfill width, no trapping is executed; rather, the letter objects are printed as overprint, meaning that they are printed on the background color without the background color being knocked out in the region of the letter objects. No knock-out (cutting) is thus executed.

Black objects are treated like non-transparent objects, such that all other colors or colorants are expanded below these objects. All objects whose neutral density lies above a specific threshold are treated as black objects. This threshold lies in the range from 70% to 100% of the neutral density of black. It advantageously lies in the range from 85% to 95% of the neutral density of black. In principle highlight color colors can be viewed as black.

From offset printing it is known to generate a "superblack". Given electrophotographic printers that print with toner particles, it can be appropriate to print other colors below the black to increase its color density in order to obtain an intensive black. These other colors are designated as support colors. So that a mis-registration is not visible here, these support colors that are printed below the black colorants are trapped in reverse, meaning that they are retracted a bit at the border region. It is hereby securely prevented that the support colors are completely colored by the black colorant given a mis-positioning.

Highlight color objects are objects that comprise a single, specific colorant. The highlight color normally generates a color impression that corresponds to a mix of a plurality of colorants and often lies outside of the gamut that can be achieved with the process colorant. The highlight color color is not mixed with other process colors.

Since the degree of coverage of the highlight color color cannot be compared with the degree of coverage of a color composed of a plurality of process colors, given calculation of the trapping threshold the degree of coverage is not used; rather, the neutral density of the object is used.

Image objects themselves are normally subjected to no trapping method. Image objects are trapped against further adjoining objects at their edges. Here there are four different possibilities in principle: given center trapping both the image and the adjoining vector objects are expanded. Given neutral trapping each pixel is compared with the neutral density of the adjoining vector object and the overfill is executed pixel-by-pixel at one side or the other side. However, this can result in a diffuse edge impression, which is not desirable.

Given dark images a choke image trapping is executed, meaning that the adjoining vector object is expanded below the image. Contrary to this, given light images a spread image trapping is executed, meaning that the image is expanded over the object region.

The preferred trapping rule for image objects is the center trapping, which is predetermined as a standard rule (DEFAULT). Grey level images are treated like color images. No trapping is executed between adjoining image objects.

Since the trapping is executed wholly automatically in the present method, certain trapping parameters are to be provided. These trapping parameters can be specification values (default values) stored in the printing system or also be added trapping parameters individual to the print document. A set of complete trapping parameters in the printing apparatus 13 or in its print data controller 17 is advantageously stored such that print data can be trapped in the printing system solely with the trapping instruction that a trapping should be executed. This complete set of trapping parameters (default values) can be overwritten or replaced by individual trapping parameters transmitted with the print data stream, or the resources explained further below, which resources can also be stored in the printing system, can also be replaced by these default values.

In the present method two different sets of trapping parameters are advantageously used, whereby the one set of trapping parameters controls the trapping parallel with the transport direction of the recording medium in the printer and the other set of trapping parameters controls the trapping transverse to the transport direction of the recording medium in the printing device.

The individual trapping parameters are subsequently explained using the tables shown in FIG. 6.

The width of the overfill (trap) is advantageously predetermined in a fixed manner. This significantly simplifies the generation of overfills since it must merely be determined whether an overfill should be generated and at which side of the boundary surface between two adjoining objects it should be provided, or whether it should be arranged centered around the boundary line. The width of the overfill normally amounts to one or two pixels. Given a resolution of 600 dpi, two pixels corresponds to approximately 1.5 mm. For testing purposes it can be advantageous to set the width of the overfill to a few millimeters since the overfills can hereby be detected immediately in the print image.

For non-black colorants the width of the overfills normally amounts to 0.02 to 5.0 mm, whereby the same values can be used for the X-direction and Y-direction (table 1).

The width of the overfills for black or opaque colorants is normally twice as large as the width of the overfills for non-black colorants (table 2).

If print data are scaled, i.e. transferred to a larger or smaller scale, the overfills are maintained with unchanged width. A scaling of the width of the overfills is not advantageous.

Any direction of a normal line on the boundary line between two color surfaces that runs either vertically or in a region between a vertical and a line angled by 45° relative to the vertical is viewed as an x-direction in the determination of the width of the overfill. The width of the overfill is then set by the boundary line in the direction of the vertical and not in the direction of the normal relative to the boundary line. In a corresponding manner, any direction between a horizontal and a line angled by 45° relative to the horizontal (or, respectively, between a horizontal and a horizontally running normal) applies as a Y-direction of a normal situated on a boundary line. The width of the traps is also set here not in the direction of the boundary line but rather in the direction of the horizontal (Y-direction).

In practice this means that the overfill amounts to one or two pixels either in the direction of the vertical (X-direction) or in the direction of the horizontal (Y-direction). Therefore no elaborate calculations of the width of the overfills are necessary and the overfills can be entered into the bitmap file without large computational effort. This simplifies the trapping method on the fly in the printing method.

Table 3 indicates the rules for the difference amount for assessment of the brightnesses of two adjacent regions. When the difference of the brightnesses of two adjoining regions is less than the different amount, no overfills are generated. In multi-color space (CMYK) each colorant of the object is compared. The lighter colorant is multiplied with the respective degree of coverage and increased by the percentile difference amount, and no trapping is necessary in the event that the lighter colorant thus increased is darker than the darker colorant multiplied with its degree of coverage. This comparison is executed between all colorants of the adjoining regions. When a comparison yields the necessity of a trapping, a trapping is thus executed.

Colors with a neutral density above a predetermined density limit (black density limit) are treated like black. The default value lies at 100% (table 4). However, in some cases it can also be appropriate to lower the density limit, for example to a range from 80% to 95%.

The table 5 shows the black-color limit that indicates as of which degree of coverage the color black is to be assessed as black and not as a grey color tone. The default value lies at 1.0. However, other values between 0.85 and 1 (in particular between 0.85 and 0.95) are also reasonable.

Small black objects such as letters or lines are often better printed than other objects without their region being knocked out. This overprinting requires significantly less computer power than a knocking-out and generation of an overfill. An overprint is normally made when the text is smaller than a predetermined size (12 pt) or lines are smaller than the width of the overfill for black color. The corresponding ranges of the limit values are specified in table 6.

A center trap is normally generated only when the neutral density of the two adjoining regions is the same. The range within which a center trap is generated can be expanded with a center trap limit. The center trap limit comprises the range from 0.0 to 1.0 (table 7). The center trap limit is applied in that the neutral density of the darker color is multiplied with the center trap limit, and a center trap is generated in the event that the product is smaller than the neutral density of the lighter color.

The table 8 shows some shapes of the overfills, normal overfills for spread and choke that are also clipped (meaning that the overfill that extends into the adjoining color region does not extend beyond this adjoining color region at the edge) Overfills with beveling, a rounding and mitering are also shown.

Figure 7A:
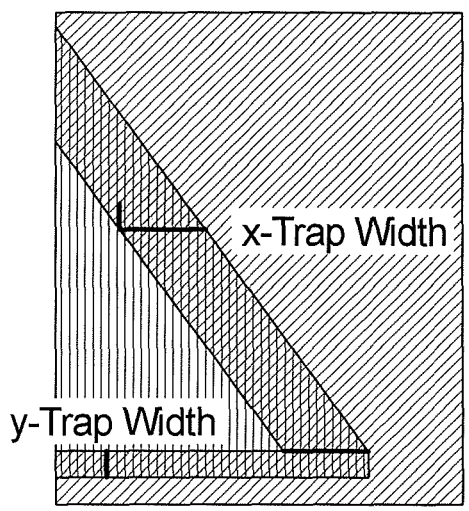
FIGS. 7a and 7b illustrate an overfill in the region of a point of an object.
Figure 7B:
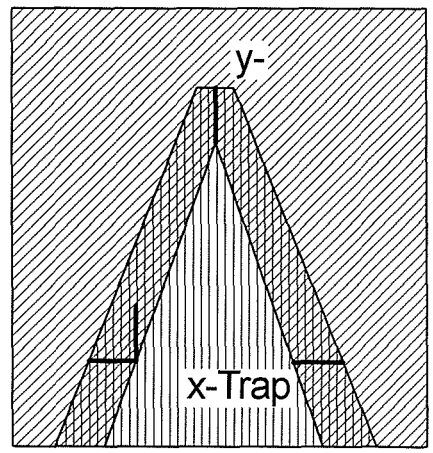

Given mitering the problem exists that given small angles an overfill with a very narrow, long point arises. It is proposed to truncate a miter overfill when it extends beyond the respective width of the overfill in the X-direction or in the Y-direction in the region of the point. This is shown in FIGS. 7a and 7b using two examples. This limitation of the miter point incurs almost no computational effort; it is independent of the orientation of the miter angle. It can be determined very quickly and does not delay the calculation of the overfills. The method can therewith be executed quickly without large computation effort and in a resource-saving manner.

Figure 8A:
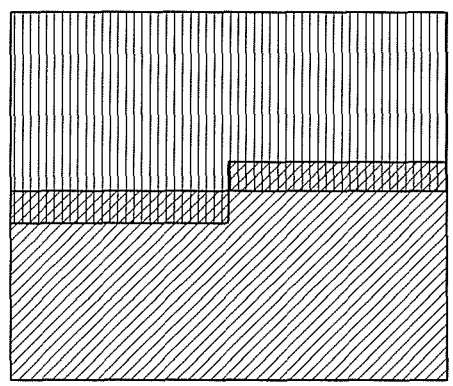
FIGS. 8a and 8b show an overfill in the region of a boundary line with brightnesses varying along the boundary line.
Figure 8B:
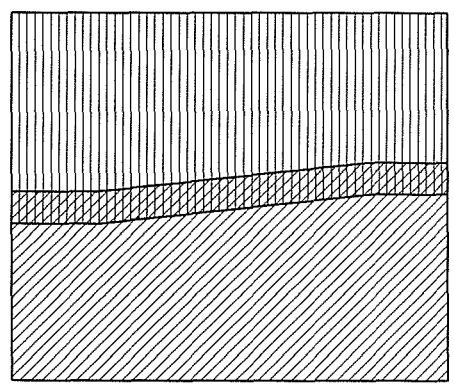

When two regions whose brightnesses gradually change abut one another, it can thus be that on a boundary line the one boundary surface at one segment and the other boundary surface at another segment is lighter relative to the respective other boundary surface. This leads to the situation that the overfill extends into the one region at the one segment and into the other region at the other segment. This change can be executed precipitously or a more gradual transition can also occur. A sliding trap limit that comprises a number range from 0.0 to 1.0 is provided for adjustment of this transition. If the value of the sliding trap limit is 1.0, the transition between the two overfills thus occurs suddenly (FIG. 8a). Given smaller values of the sliding trap limit the overfill shifts gradually over the boundary line of the abutting color regions. FIG. 8b shows a gradual transition for a sliding trap limit of approximately 0.5.

To reduce the visibility of an overfill, this can be scaled (trap color scaling). In the region of the overfill the degree of coverage is reduced by a scaling factor. The scaling factor can adopt values in a number range from 0.0 to 1.0. It is also possible that different scaling factors are provided for different colorants. The default value of the scaling factors is 1.0. A scaling factor of 1.0 means that the overfill always exhibits the degree of coverage of the darker colorant, contrary to which a scaling factor of 0.0 means that the overfill always exhibits the degree of coverage of the lighter colorant. This scaling factor is applied to the difference of the degree of coverage of the darker and lighter colorants and added to the degree of coverage of the lighter colorants. It can herewith be prevented that the overfills are too dark or too light.

Figure 9:
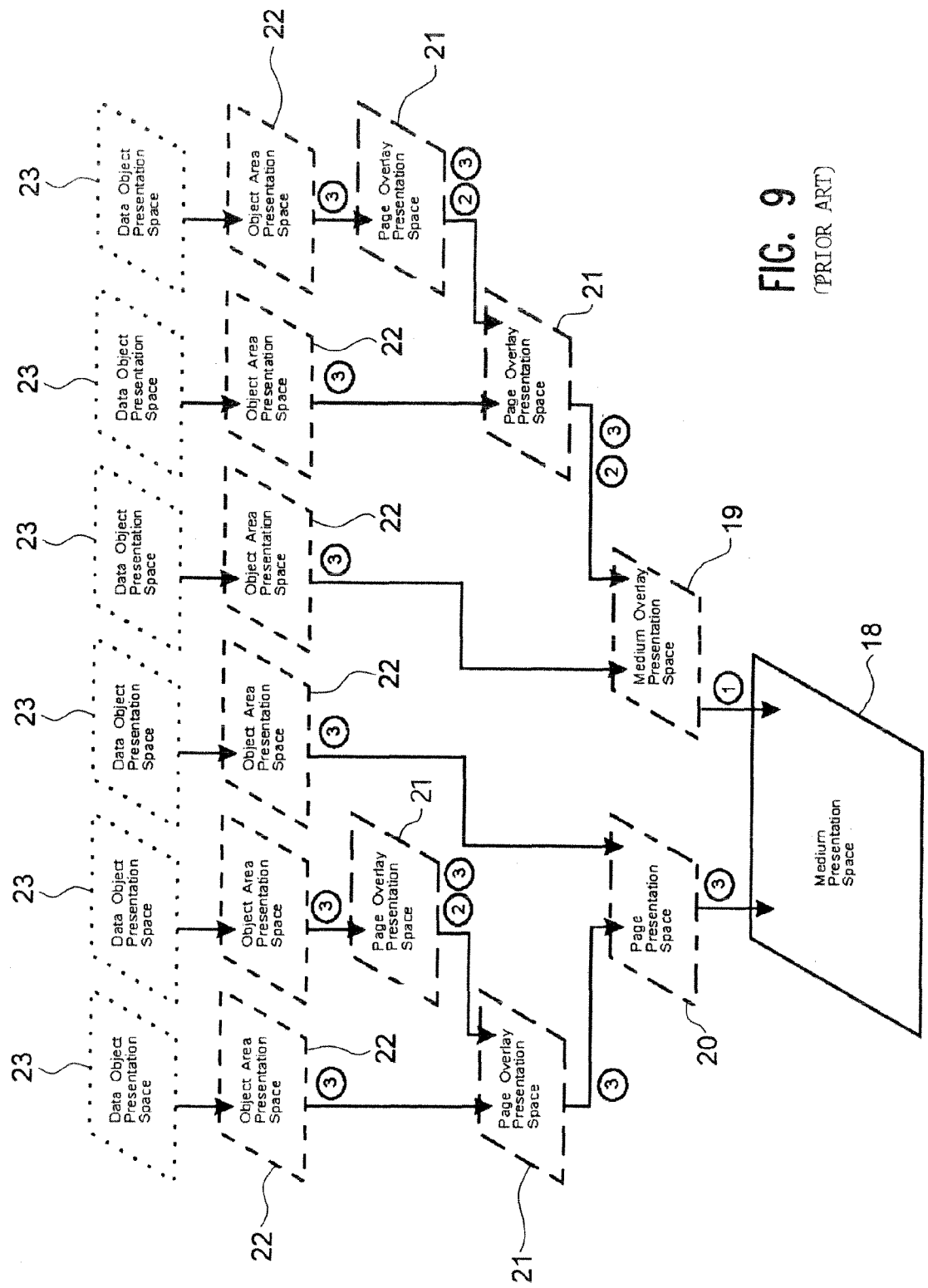
FIG. 9 schematically illustrates, an example for a hierarchical structure of an IPDS print data stream.

Implementation of the Method for Trapping of Print Data in an AFP/IPDS Data Stream The IPDS print data is explained in detail in the IBM publication "Intelligent Printer Data Stream, Reference" S544-3417-06, 7th edition (November 2002). In this publication a diagram is presented on page 31, which diagram is shown in the attachment as FIG. 9. This diagram shows an example of the hierarchical structure of an IPDS print data stream with a plurality of what are known as presentation spaces. These presentation spaces respectively define a specific region in the document to be printed. A plurality of presentation spaces can be superimposed on one another.

A medium presentation space 18 that defines the print data medium or the print medium forms the highest level in the hierarchy of the presentation spaces. This medium presentation space is a limited address space in the print data stream that is mapped to a complete page of the print data medium. There is thus only a single medium presentation space on one page of a print data medium. The print instructions and print data contained in a medium presentation space thus apply for the entire page.

Furthermore, there is a medium overlay presentation space 19, a page presentation space 20, page overlay presentation space 21, object area presentation space 22 and data object presentation space 23.

All presentation spaces can comprise print data and print instructions. The data object presentation spaces 23 in which the data objects (graphics and text) to be printed are contained represent the lowest level of the presentation spaces. These data object presentation spaces 23 are linked (merged) with the object area presentation spaces 22 that are provided for specific objects. The object area presentation spaces 22 are in turn linked with page overlay presentation spaces 21. In principle overlays can comprise any arbitrary combination of text, image graphic, barcode and what are known as object container data. Overlays are normally used as a type of form into which the data objects of the lower levels are inserted.

The order in which the individual presentation spaces are linked with one another is exactly established.

In principle, trapping instructions of a lower level have priority over trapping instructions with regard to a higher level since the print instructions in a lower level have a more direct relation to the respective object.

In the highest level (the medium overlay presentation space 19) a trapping instruction "global trapping enabling/disabling information" is provided with which the trapping of the print data stream can be generally activated and deactivated. This trapping instruction breaks the priority rule explained above according to which the trapping instructions of lower levels have priority over trapping instructions of higher levels. In principle it allows an operator of the printing system to activate or deactivate the trapping in a simple manner in that this trapping instruction is merely inserted into the uppermost level.

The trapping instructions can be defined separately with a trapping triplet (which is explained in detail further below) in each presentation space. The trapping settings in the individual presentation spaces can hereby be individually regulated. In principle it also applies here that the trapping instructions of one presentation space of a lower level can overwrite (overrule) a corresponding trapping instruction of a presentation space of a higher level. Deviating from the typical practice of the IPDS data stream, the trapping can hereby be controlled in the lower levels (for example the data object presentation spaces) and this trapping instruction cannot be modified by presentation spaces provided in higher levels. A user who generates a data object to be printed can hereby unambiguously and irrevocably designate whether and how this data object is subject to the trapping method. There are data objects in print data that generally may never be subjected to a trapping method. Such data objects are, for example, barcodes. If barcodes were subjected to a trapping method, the stroke width of the individual barcode would be altered, whereby the meaning of the barcode would be lost. Even if a trapping should be provided at presentation spaces arranged in higher levels, data objects in which the trapping method is enabled at the level of the data object presentation spaces are not subject to a trapping method.

Not all trapping parameters must be defined in the print data stream. Trapping parameters not defined in the print data stream are supplemented by default values stored in the printing apparatus 13 or in the print data controller 17. In practice it is appropriate to establish optimally few trapping parameters in the print data stream since the trapping method is very printer-specific. The offset of the individual color separations on a print data medium normally depends on the mechanical properties of the printing apparatus, such that in principle trapping parameters (such as, for example, the width of an overfill) are best established in the printing apparatus 13. Only trapping parameters that are not specific to the print data itself (such as, for example, the deactivation of the trapping method for barcode objects) should be defined in the print data stream.

The principle of the supplementation of the trapping parameters with specification values in the printing apparatus allows the generation of the print data stream to be kept simple since only a few fundamental and general trapping parameters are defined in the print data stream, which fundamental and general trapping parameters are supplemented by further specific trapping parameters in the printing apparatus.

According to the preferred embodiment, the resource structure of the AFP data stream and of the IPDS data stream is used for the control of the trapping method. Print data are generated at the user computer 9 (FIG. 3) and transmitted to a print server 11 by means of the AFP data stream. In the print server 11 the AFP data stream is prepared and converted into an IPDS data stream for output to the printing apparatus 13. In the print server 11 a plurality of processes run that are controlled by software modules. A first software module embeds resource data (such as fonts or overlays) that are called in the original print data stream into said print data stream. A second software module, the parsing module, checks the print data stream for consistency with predetermined rules. A pre-parsing process that is implemented by a corresponding software module is upstream of the parsing process, in which pre-parsing process an identification datum (in addition to the resource name) is associated with each resource call and the associated resource file, via which identification datum the resource is uniquely identified relative to all other resources of the document data stream. Within the document data stream the resource can then be called once or multiple times by means of the resource name and/or the identification datum for presentation of the print data and the resource data at the printing apparatus 13. The processes shown here in the print server can also be implemented in part or entirety in the print data controller 17 of the printing apparatus 13.

In the shown exemplary embodiment the AFP document data stream comprises documents that correspond to the MO:DCA standard and that respectively comprise reference data regarding data objects that are available via the print server 11 and in the print data controller 17. The resource data can thereby be transferred from the user computer 9 to the print server 11 and the print data controller 17 separate from the MO:DCA document data stream or can already be stored in the print server 11 and in the print data controller 17 as external resources. However, the resource data can also be transferred as embedded resource data (what are known as inline resources) together with the document data stream from the user computer 9 to the print server 11. Further details of a corresponding data processing are described in WO-A1-2004/0008379, which for this is incorporated by reference at this point of the specification. The resource data can comprise what are known as data object resources that contain object data which are in particular referenced multiple times in an identical manner in the document data stream. Such data objects can, for example, be image data, text data, graphic data and/or trapping data. The reference to the object resources can occur via an object resource library that comprises identifying data regarding the object as well as data bout the storage location of the corresponding object data. The library comprises a data object resource access table (RAT) that, for the print server 11, acts as an index table for the access of the print server to the resource data.

The print server 11 receives the MO:DCA document data stream from the user computer 9, converts it into an IPDS document data stream and sends this to the printing apparatus 13. In the course of the data conversion it reads the reference information (name) of a data object from the MO:DCA document data stream and accesses the stored data resource with the aid of the data object resource access table (RAT). The complete data of the object are then integrated into the IPDS data stream and sent to the printing apparatus 13. This method can be applied just as well when the data are sent to another output apparatus (for example to a color monitor) instead of to a printing apparatus.

An MO:DCA document data stream is structured in data elements that are largely self-explanatory. Structured fields are important components of the MO:DCA structure. A structured field is subdivided into a plurality of parts. A first part (introducer) identifies the desired command, specifies the complete length of the command and specifies additional control information (for example whether additional padding bytes are present). The data contained in a structured field can be encoded as fixing parameters, comprise repetition information (repeating groups), keywords and what are known as triplets. The fixing parameters deploy their effect only for the structure in which they are contained. Repetition groups specify a grouping of parameters that can occur multiple times. Keywords are self-explanatory parameters that typically comprise two bytes, whereby the first byte is an identification byte for the keyword and the second byte is a data value characterizing the keyword. Triplets are self-explanatory parameters that comprise, a length specification in a first byte, an identification information characterizing the triplet in a second byte and then up to 252 data bytes. The cited data structures of an MO:DCA document data stream define a syntax that can be evaluated in the course of a parsing process and is flexibly expandable.

MO:DCA data streams are hierarchically subdivided similar to the IPDS data streams explained above.

The resource data can be generated at different points: the user computer 9, the print server 11 and even by means of a control panel on the printing apparatus 13. These resource data are sent once to the print data controller 17 of the printing apparatus 13 and stored there so that they can always be used again when a corresponding print data stream references them.

For a user of the user computer 9 or operator of the print server 11 the possibility hereby exists to generate specific trapping settings once as resource data and to store them at the print data controller 17, which specific trapping settings are then repeatedly called.

Figure 10:
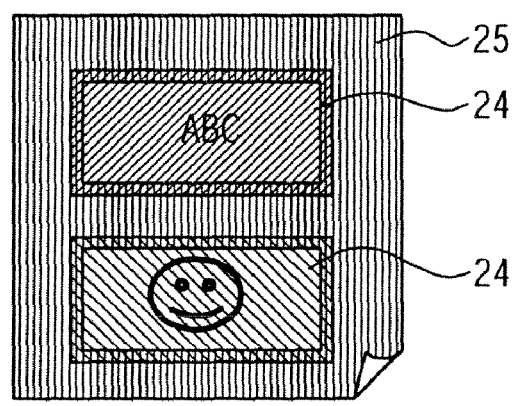
FIGS. 10, 11, 12 show trapping examples in a print data stream.

Some trapping examples in an IPDS print data stream are subsequently explained:

FIG. 10 shows an example in which two presentation spaces 24 are filled with respectively one uniform dark background color and with a presentation space 25 lying beneath them that is filled with a lighter color. Here overfills are to be generated at the edge of the presentation spaces 24 since here color regions of different brightness abut one another. A trapping instruction in the presentation space 24 regulates the manner of how the trapping is executed at the edge with presentation space 25.

Figure 11:
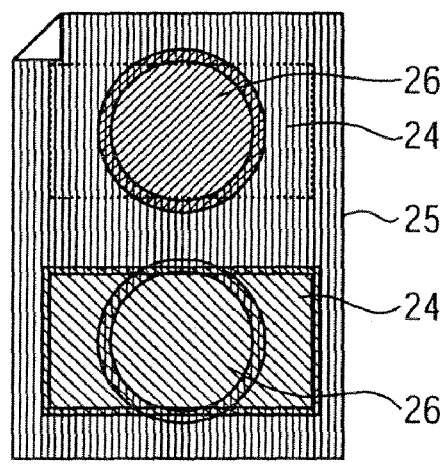

Shown in FIG. 11 is a similar example with two presentation spaces 24 in which a circular element (data object presentation space 26) is respectively arranged. The upper presentation space 24 is transparent, i.e. filled with no background color. This presentation space 24 comprises an instruction that the trapping of objects contained therein with underlying presentation spaces is to be implemented.

Contrarily, the lower presentation space 2 is filled with an opaque background color, such that the circular element 26 is to be trapped with regard to the presentation space 24 and not with regard to the underlying presentation space 25.

It can also be desirable to employ different trapping rules for different elements within a presentation space, for example for different graphic elements (GOCA) that possess filled or empty borders. "Trapping Drawing Orders" and "Trapping Text Controls" are provided for such cases.

Figure 12:
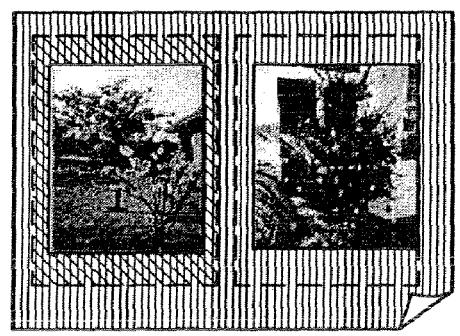

In principle no trapping is executed given multi-level images contained in IOCA presentation spaces since they are considered as opaque objects. Here a trapping occurs only at the borders of the image or at the edges of the IOCA presentation space when this is filled with a background color (FIG. 12).

FIG. 13 shows the AFP/IPDS trapping parameter triplets in table form, whereby the triplet (offset, name, range) is specified in the respective first three columns. The meaning of the triplet is explained in the fourth column. In the fifth column it is specified whether the triplets are optional or mandatory. Exceptions are specified in the sixth column.

The trapping is conventionally dependent on the paper run direction. The trapping parameters in the paper run direction therefore often differ from those transverse to the paper run direction. Given the trapping parameter triplets the Y-direction always means parallel to the paper run direction and the X-direction is rotated by 90° transverse to the paper run direction. In the event that an object is rotated, the print data controller automatically applies the parameter of the corresponding direction.

Typically an L-unit is defined as a unit of measurement in an IPDS data stream. This L-unit can be defined divergently for the trapping parameters. Some abbreviations are listed in the tables. They mean:

TID Trapping ID
UPUB L-units per UnitBase
TS Limit trap step limit (difference amount)
BD Limit black density limit (density limit)
BC Limit black color limit
CT Limit center trap limit
TCS trap color scaling (scaling factor)

The trapping method is primarily executed in real time in the print data controller 17 (FIG. 3), such that the print data are supplied without delay in the printing process. The print data controller 17 does not necessarily have to be integrated into the printing apparatus 13, but rather can also be arranged outside of the printing apparatus 13, for example as a separate raster image process (RIP). The print data controller 12 can comprise special hardware circuits, for example FPGAs (Free Programmable Gate Arrays) or ASICs (Application Specific Integrated Circuits). It can also be operated on a typical computer (data processing apparatus) such as, for example, a personal computer with one or more Intel® Pentium Processors or another processor system with suitable operating system. It can furthermore be provided with a microprocessor in which is stored an executable computer program that is designed for execution of the method. This computer program can naturally also be stored on a data medium independent of the printing system.

The preferred embodiment is in particular suitable to be realized as a computer program (software). As a computer program module it can therewith be distributed as a file on a data medium such as a diskette or CD-ROM or as a file via a data or communication network. Such and comparable computer program products or computer program elements are variations of the preferred embodiment. The workflow of the preferred embodiment can be applied in a computer, in a printing apparatus or in a printing system with upstream or downstream data processing apparatuses. It is thereby clear that corresponding computers on which the preferred embodiment is applied can comprise further known technical devices such as input means (keyboard, mouse, touchscreen), a microprocessor, a data or, respectively, control bus, a display device (monitor, display) as well as a working memory, a fixed disk storage and a network card.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A method for trapping print data with a plurality of objects by enlarging of lighter colors to spatially over-fill the lighter colors, comprising the steps of:
    transferring the print data together with first trapping instructions and/or parameters contained in an AFP/IPDS print data stream comprising triplets containing said first trapping instructions and/or said parameters for execution of the trapping in a computer or a printing device by said enlarging of lighter colors to spatially over-fill the lighter colors; and
    referencing with the print data stream resource data that can be repeatedly retrieved and which contain second trapping instructions and/or parameters specific to the printing device.

2. A method according to claim 1 wherein the resource data are stored in a print data controller.

3. A method according to claim 1 wherein the print data—together with the first trapping instructions and/or parameters—are transferred in the print data stream to the printing device, and the print data stream is structured in different levels, wherein a higher the level, a greater a scope which first trapping instructions and/or parameters contained in the respective level affect, and first trapping instructions and/or parameters from lower levels have priority over first trapping instructions from higher levels.

4. A method according to claim 1 wherein the first trapping instructions and/or parameters contained in the print data stream for execution of the trapping in the computer or in the printing device comprise instructions which are not printer specific whereas the second trapping instructions and/or parameters contained in the resource data are printer-specific and are more extensive than the first trapping instructions and/or parameters contained in the print data stream.

5. A method according to claim 4 wherein said first trapping instructions and/or parameters in said print data stream are not specific to the print data itself.

6. A method according to claim 4 wherein the first trapping instructions and/or parameters in the print data stream indicate whether or not to deactivate trapping.

7. A method according to claim 1 wherein the first trapping instructions and/or parameters contained in the print data stream are only a few fundamental and general instructions compared to the more detailed second trapping instructions and/or parameters in the data resource.

8. A printing system for trapping print data to be printed on a printing device, comprising a print data controller and multiple printing groups, wherein the print data controller is designed to execute a trapping method by enlarging of lighter colors to spatially over-fill the lighter colors comprising the steps of:
    receiving in an AFP/IPDS print data stream the print data together with first trapping instructions and/or parameters contained in triplets of said AFP/IPDS print data stream for execution in the trapping controller by said enlarging of lighter colors to spatially over-fill the lighter colors; and
    referencing with the print data stream resource data that can be repeatedly retrieved and which contains second trapping instructions and/or parameters specific to the printing device.

9. A printing system according to claim 8 wherein the print data controller is designed as a microprocessor, and a computer program for execution of the method is stored and can be executed in the print data controller.

10. A non-transitory computer-readable medium comprising a computer program tangibly embodied therein for trapping print data by enlarging of lighter colors to spatially over-fill the lighter colors, said print data having a plurality of objects, and said print data to be printed on a printing device, said program performing the steps of:
    receiving the print data together with first trapping instructions and/or parameters contained in an AFP/IPDS print data stream comprising triplets containing said first trapping instructions and/or said parameters for execution of the trapping in a computer or in the printing device by said enlarging of lighter colors to spatially over-fill the lighter colors; and
    referencing with the print data stream resource data that can be repeatedly retrieved and which contain second trapping instructions and/or parameters specific to the printing device.

11. A method for trapping print data with a plurality of objects by enlarging of lighter colors to spatially over-fill the lighter colors, comprising the steps of:
    transferring the print data together with first trapping instructions and/or parameters contained in an AFP/IPDS print data stream comprising triplets containing said first trapping instructions and/or said parameters for execution of the trapping in a computer or in a printing device by said enlarging of lighter colors to spatially over-fill the lighter colors; and
    referencing with the print data stream resource data that can be repeatedly retrieved and which contain second trapping instructions and/or parameters specific to the printing device, and wherein a complete set of the second trapping instructions and/or parameters is stored as default values in the printing device or in a print data controller.

* * * * *